Feb. 9, 1932.   R. R. HARMON   1,844,851
PROCESS FOR REMOVING SUSPENDED SOLIDS AND LIQUIDS FROM GASES AND VAPORS
Filed Sept. 7, 1929
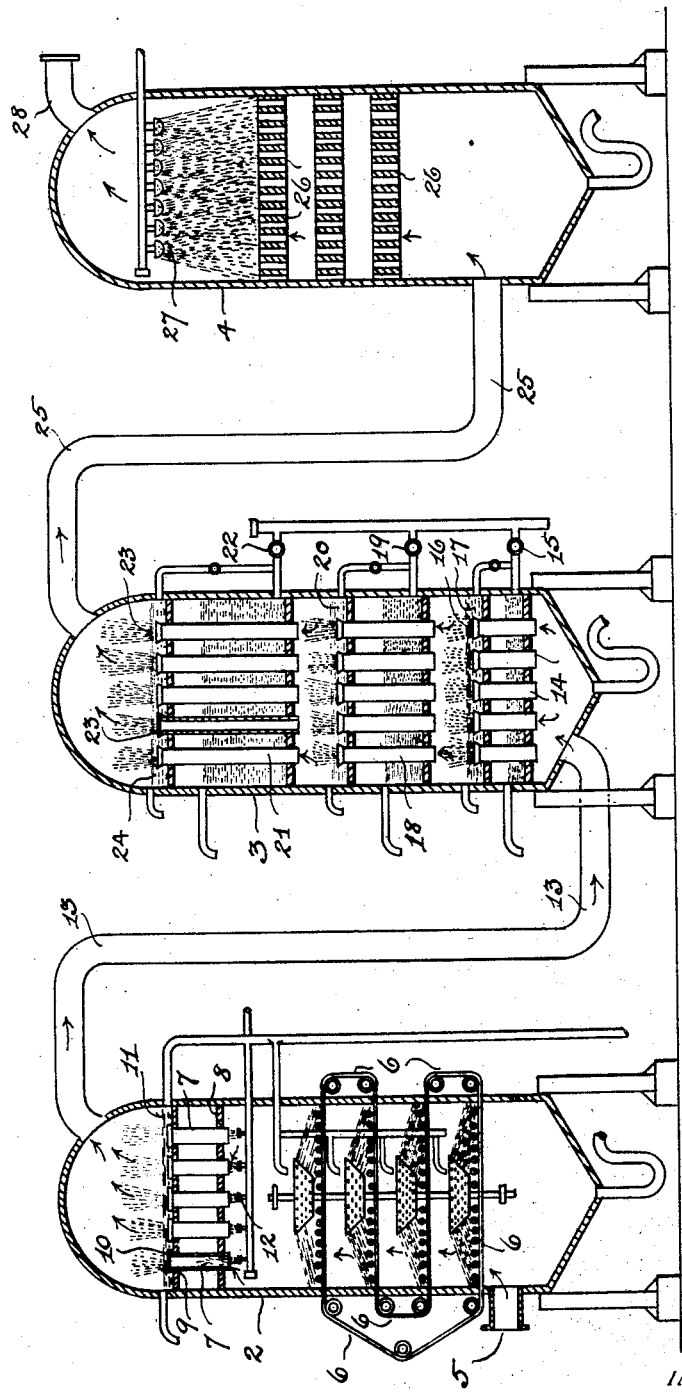
INVENTOR
Robert R. Harmon
BY
Charles B. Mann Jr.
ATTORNEY Patented Feb. 9, 1932

1,844,851

UNITED STATES PATENT OFFICE

ROBERT R. HARMON, OF CHARLOTTESVILLE, VIRGINIA, ASSIGNOR TO PEABODY ENGINEERING CORPORATION, OF NEW YORK, N. Y., A CORPORATION OF NEW YORK

PROCESS FOR REMOVING SUSPENDED SOLIDS AND LIQUIDS FROM GASES AND VAPORS

Application filed September 7, 1929. Serial No. 390,903.

This invention relates to a process for removing suspended solids and liquids from gases and vapors through stages of condensing vapors upon the suspended particles and removal of the particle-centered droplets thus formed by filtration between the condensing stages.

Repeated attempts have been made over a period of years, to utilize the condensation phenomenon in the purification of dust and fume laden gases, but with only partial success. I have found that these repeated failures were not due to the inadequacy of the phenomenon involved, but to the lack of experimental evidence which would disclose to the investigator, the nature of the many factors he was confronted with, or which would direct him to the proper means of control of the phenomenon. In practically every case in which wet-cleaning of hot gases is involved, the phenomenon of condensation should be credited with what success is thereby attained in freeing the gases of their suspended solids or liquids.

I have devised a process involving a means for control of the condensation phenomenon, which, together with the operation of suitably designed apparatus, is capable of rendering industrial gases, such as those issuing from blast furnaces, kilns of various kinds, boiler stacks, and similar sources, free of suspended solids or liquids to a greater degree than is attainable in any process within my knowledge.

As the demand for absolutely clean gases is far ahead of the degree of cleanliness to be attained by means of standard methods or processes at the present time, I believe my process will be of great importance and assistance to the industry, as it is simple in operation and economic in its application.

It is believed appropriate to discuss here the present theory of cleaning gases by condensaton means, and the methods employed in doing so.

One of the simplest systems,—i. e. a gaseous body having finely divided particles suspended therein,—one could encounter, would be one which contained a finite number of similar particles of equal size and mass, in which case, the difficulty in removing the particles from this gaseous body would be due principally to the effort involved in reaching those few particles which remained in a high degree of dispersion after the bulk of particles had been removed.

Unfortunately, this simple set of conditions is never present in the case of industrial gases similar to those named above, and we are forced to deal with systems in which an almost infinite number of particles are encountered, composed of widely differing chemical substances, and which constitute a graded series in respect to size. In other words, one encounters myriads of particles of different substances, existing in myriads of shapes and sizes in each unit volume of raw gas. As shown by experience, these particles may be placed in two main classes, viz., the hygroscopic class and non-hygroscopic class. The former class contains those particles which have and manifest an affinity for water, whereas, those of the latter class do not.

If we cool a vapor or a vapor-laden gas, in which such substances are dispersed, condensation of the vapor takes place about these bodies as centers, and with continued cooling of the vapor or vapor-laden gas, droplets will be formed about these dispersed substances as centers, and grow and grow until the vapor is completely transformed into liquid. In other words, as cooling of a saturated vapor or satured vapor-gas mixture takes place, super-saturation of the vapor is relieved by the presence of such suitable surfaces or centers, on, and about which, condensation of the vapor can take place. Once condensation begins around these nuclei, it will continue as cooling proceeds, and the originally formed droplets will grow consistently as in the natural formation of rain.

Condensation of vapor, quite naturally, takes place first on the hygroscopic particles, even though the vapor is in an undersaturated condition. If rapid cooling occurs after the dew point of the vapor or (saturated) vapor-gas mixture is reached, condensation becomes tumultuous and the largest particles of both classes become active centers. The smallest particles and least hygroscopic ones are the last to receive condensing vapor, due to the greater affinity displayed by the larger particles, together with their more rapid rate of growth. Normally, the total quantity or number of the finest particles originally contained in the gas, is inappreciably diminished in a cleaning process of this character.

The reason for this is readily apparent from a study of the present methods employed. The hot, dust-laden gas, containing some water vapor is brought into direct contact with cooling water in the form of jets, sprays, or drops, in large quantities. The gas is rapidly cooled below its dew point and tumultuous condensation occurs about both classes of particles and the drops of cooling water, simultaneously. The largest particles, which are easily removable by other means, serve first as centers of condensation, and consequently they receive the greatest portion of available vapor before leaving the gas stream. The smallest particles together with very small droplets, remain in the gas stream and the latter continue to grow throughout the entire cooling stage, at the expense of the smallest particles and least active nuclei. In the end, innumerable particles remain in suspension in the gas stream as originally. They have been only partially weighted with water because there is never available, at any time, sufficient vapor to cause the infinite number of particles, of all sizes and kinds, to grow or become heavy enough to fall by gravity out of the rapidly moving stream of gas. No precautions have been taken to conserve the original thermal energy in the gas, nor to secure the maximum humidification of the gas in its treatment with cooling water, nor to adequately strip the gas of the greater bulk of suspended particles before permitting condensation to take place.

My invention completely alters the present methods of treating such gaseous systems and a further discussion of theory is necessary in order to make certain of its features perfectly clear.

In the case of two bodies reacting thermally, e. g. a hot radiating body and a cold, heat absorbing one, the greatest transfer of heat from the first to the second takes place when their temperature difference is the greatest, and the rate of heat transfer falls off as this difference in temperatures decreases. Accordingly, in the case of cooling a hot gas containing a saturated vapor, the greatest precipitation of vapor occurs simultaneously with the initial fall in temperature of the gas-vapor mixture, first, because the vapor content per degree of temperature is greater, and second, because the greatest lowering of temperature of such a mixture occurs in the first stages of any natural cooling process.

In view of the above, it should be readily grasped that, if the hot, dust-laden and vapor-laden gas comes into even indirect contact with a cooling medium, in sufficient quantities to effect ultimate cooling of the gas, and, if the gas contains a graded assortment of suspended particles, the greatest drop in temperature occurs, upon initial contact, and along with it, the greatest loss in available vapor. This vapor condenses on the most active centers, viz. the most hygroscopic and the largest, leaving only a small share of vapor for the most numerous and smallest particles.

Furthermore, it is believed to be clear that all particles do not require the same quantity of vapor to be condensed upon themselves in order to cause sufficient growth or weight to make them readily removable from the body of gas by means other than gravitational or centrifugal.

In contradistinction to this natural phenomenon, I propose an entirely artificial one, which is to apportion the vapor store, so to speak, among the suspended particles, by stages, and in order of particle size. By so doing, I am able to exert absolute control over the rate of vapor dissipation, or temperature fall, during the cooling and condensing process. This implies also the control of the rate and amount of growth of the different grades of suspended particles, as vapor condensed upon them.

I do this by reversing the natural order of cooling of the gas-vapor mixture, through accurate thermostatic control of the temperature of the mixture, stage by stage, to cause the least lowering of the temperature of the mixture in the first stage and to cause equal or increasing degrees of temperature lowering in subsequent cooling stages. This, as explained in part above, is for the purpose of compensating for the difference in the quantity of available vapor which would condense per degree fall of temperature, at high temperature range, as against the small quantity of vapor which could condense per degree of temperature fall at low temperature ranges, and further, of rendering available, increasing amounts of vapor for the successive grades of suspended particles or nuclei, of increasing numbers and diminishing sizes.

It frequently happens that the raw, uncleaned gas, does not contain sufficient vapor originally to secure the degree of cleanliness desired, due to a disproportionate number of very fine particles, unduly large amounts of hygroscopic particles, or some other ungovernable contingency. In such case, the vapor store must be increased or augmented from an outside source, utilizing some such means as the injection of a small amount of steam in one or more stages.

Now to render the process economical of operation and at the same time effective in spite of such contingencies as mentioned above, the raw gas must first be thoroughly stripped to reduce the number of particles of both classes to a minimum, and thereby preclude their unnecessarily appropriating a large portion of the vapor to themselves in the condensing stages.

From prolonged experiments and observations, I have found that water sprays or jets, whether stationary or of a rotary design, are entirely inadequate for stripping the originally dust-laden gases to the degree required by the economics of this improved process.

In accordance with my invention, I do not permit the suspended particles to become "weighted down" or "precipitated in a moving body of gas", with the condensed liquid, but interrupt their growth at stages by momentarily stopping the cooling and condensation of vapor, and remove the droplets from the gas stream. This step ensures that no undue quantity of vapor will condense on the dust or fume-centered droplets which have grown to the requisite size for easy removal, and further, insures that the next smaller particles in the graded series, will, in turn, become the active centers for condensation and growth in the next stage of operation.

To remove the droplets from the moving body of gas, I employ as a means, what may be termed "liquid-filtration". This term as hereinafter used, refers to the passing of a gas through a series of small orifices or interstices, whereby coalescence of the droplets occurs, then upward, into, and through a body of liquid, where coalescence again takes place by impact with the body of the liquid, resulting in the desirable filtration action.

As herein disclosed, the process is preferably divided into three distinct stages and special apparatus is indicated in the drawing for the first two stages but not for the latter. I wish to point out however that, whereas for most economical operation, three stages are desirable, nevertheless the final stage is not required, as it is solely an economic step and useful in so far as complete cooling of the gas is desirable or beneficial. As represented in the process, it has absolutely nothing to do with the cleaning of the gas.

It would be possible to combine the three stages into a single piece of apparatus to economize space and equipment, but as such factors are irrelevant in so far as the operation of the process is concerned, they will be ignored in the further discussion.

The accompanying drawing illustrates diagrammatically an apparatus for carrying out the process, it being understood that portions of the apparatus shown in the first and second stages of the process form the subject-matter of separate applications for patents, executed and filed by me on even dates herewith.

In the drawing, the single view shows the stripping, condensing and cleaning and cooling units all connected up so that the raw gas may be received by the stripper 2, then passed to the condenser and cleaner 3, and finally delivered to the cooling unit 4.

The stripper 2, includes briefly, a shell having an intake 5 in its base through which the raw gas is delivered to the interior. The gas then passes up through continuously-traveling screens 6 over each of which a spray of water is directed and the heavier dust particles in the gas are removed at the screens and carried off.

Above the screens are a series of tubes 7, mounted in suitable headers 8 and 9 and each tube has a perforated head or cap 10 through which the gas is driven.

The heads or cap-ends of the tubes 7 are submerged in a moving body of hot water 11 maintained on top of the upper header 9 and the gas from the tubes must pass through said hot water.

A series of steam nozzles 12, arranged beneath the tubes permits a supply of steam to be directed into the gas streams when it is desired to add vapor thereto, and the stripped and humidified gas passes by pipe 13 from the stripper to the next unit, where condensing and cleaning is carried on.

It will thus be seen that the gas is first stripped of the larger suspended particles at a temperature above its dew point, thereby preventing chilling of the gas.

The preliminary-stripped gas now enters unit 3, where it is to be subjected to several stages of condensing out vapors on suspended particles and the removal of the particle-centered droplets from the stream.

In the present disclosure, the gas is broken up into streams by passing through a series of lower tubes 14 which are cooled by water under control of a thermostat 15. Each tube has a perforated head 16 and all of the heads are submerged by water that has passed through the thermostatic control means so that vapor is condensed out of the gas streams on suspended particles therein and the particle-centered droplets thus formed are filtered out as the gas from the heads passes through the moving body of filtering water 17.

The gas is then again divided by another series of tubes 18 of a greater length and increased area and greater cooling capacity, wherein further condensation of vapor on additional suspended particles takes place, thereby forming a second condensing and removing stage.

Here the cooling water is controlled by a thermostatic valve 19 which is independent of other such controls.

As the gas then passes from the set of tubes 18, it is passed through another body of moving filtering liquid 20 where the additional particle-centered droplets are filtered out and carried off.

The gas again is divided by the tubes 21 which are of greater length than those at 18, and of a still greater cooling capacity and whose cooling fluid is controlled by another thermostatic valve 22.

Here in tubes 21 further condensation takes place on suspended particles and these particle-centered droplets pass through the heads 23 and are filtered out and carried off by the filtering liquid 24.

Thus it will be seen that in the unit 3, the gas is passed through a plurality of stages each of which condenses vapors on suspended particles and particle-centered droplets are removed between each stage.

It is therefore to be understood that with the present apparatus controlled cooling takes place with the proper apportionment of the vapor in the saturated gas, among the residual number of suspended particles, to form droplets about these particles and effect their removal from the gas in successive stages.

By utilizing a plurality of separate cooling stages of increased cooling capacity, together with the features of separate thermostatic control of the cooling liquid supplied to each stage, I am able to cause the proper degree of cooling in each stage, reversing the natural order of cooling in the apparatus when desired, and can therefore apportion the vapor to be condensed, among the various grades of suspended particles in either equal or varying amounts, as in an ascending or descending progression, to suit the needs of any individual set of conditions.

Furthermore, by passing the gas through the body of liquid overflowing the perforated tube-heads, I am able to readily remove the droplets formed during the cooling and condensation of the vapor in the preceding cooling stage, and I thereby prevent the continued growth of such particle-centered droplets. Thus, I cause the vapor to condense on the suspended particles solely, to cause their proper growth in the cooling stages, and remove the dust-centered or fume-centered droplets as the gas is filtered through the body of liquid in which the tube-heads are submerged.

The gas leaves unit 3 by pipe 25 and enters the base of unit 4 where it may be passed through checker-work 26 and sprays of water 27, or other suitable means, after which it is led off by conduit 28 to a suitable holder.

Having described my invention, I claim,—

1. The process of cleaning gases and vapors consisting in condensing vapor in the gas stream around suspended particles in the stream to form suspended particle-centered droplets, intercepting the particle-centered droplets before they become heavy enough to fall by gravity by passing the gas stream containing the suspended droplets through a body of water that flows across the path of the gas-stream and maintaining the body of water in said path by the pressure of the gas.

2. The process of cleaning streams of continuously-flowing gases consisting in condensing vapors in the streams of flowing gas around suspended particles therein to form suspended particle-centered droplets, passing the plurality of streams of gases containing the suspended particle-centered droplets through a moving body of water that flows across the path of the gas-stream to remove said droplets and particles, and conveying said droplets and particles out of the path of the gas-stream in said body of moving water.

3. The process of cleaning a continuously flowing stream of hot gas, consisting in preliminarily removing the heavier particles from the hot gas by obstructing the passage of said stream and simultaneously subjecting said obstructed stream to hot water sprays to strip the gas of the larger suspended particles at a temperature above its dew point, then passing the stripped gas stream through a plurality of stages to condense vapor and form droplets on suspended particles and removing said droplets from the gas stream in said stages by barriers of water moving across the gas stream through which the gas stream must force its way, and leaving the droplets containing the particles in said barriers of moving water.

4. The process of cleaning a continuously flowing hot gas consisting in preliminarily removing heavier particles from the hot gas-stream by obstructing the passage of said stream and simultaneously subjecting said obstructed stream to hot water sprays to strip the gas of the larger suspended particles at a temperature above its dew point, then passing the stripped gas-stream through a plurality of stages to condense out vapors and form droplets on suspended particles and between the condensing stages passing the gas-stream through independent barriers consisting of bodies of water which move across the path of the gas-stream and through which the gas must force its way leaving the droplets containing the particles in said barriers of moving water and flowing the water barriers off from the path of the gas-stream to carry the droplets and particles away from further contact with the gas stream at any one barrier.

5. The process of cleaning a continuously-flowing stream of hot gas consisting in preliminarily removing the heavier particles from the hot gas by obstructing the passage of said stream and simultaneously subjecting said obstructed stream to hot water sprays to strip the gas of the larger suspended particles at a temperature above its dew point, then passing the stripped gas stream through a plurality of stages to condense controlled quantities of vapor to form droplets on suspended particles and removing said droplets from the gas stream in said stages into barriers of water flowing across the gas stream through which the stream of gas must force its way.

6. The process of cleaning continuously flowing hot gas streams consisting in condensing vapor in the gas stream around suspended particles to form particle-centered droplets, passing a body of water across the path of the gas stream to obstruct the gas-stream by forcing the latter to pass therethrough so that the suspended particle-centered droplets will be intercepted by the body of water before said droplets become heavy enough to fall by gravity, again condensing additional vapors from the gas-stream to form other suspended particle-centered droplets and then passing the gas-stream through another body of water that is movable across the path of the gas-stream to intercept the said other suspended droplets and remove them from the gas-stream.

7. The process of cleaning a continuously-flowing stream of hot gas consisting in condensing vapor in the gas stream around suspended particles to form particle-centered droplets, passing a body of water across the path of the gas-stream to obstruct the gas stream by forcing the latter to pass therethrough and maintaining the body of water by the pressure of the gas stream, intercepting the particle-centered droplets by the body of water before said droplets become heavy enough to fall by gravity, again condensing additional vapor from the gas stream to form other suspended particle-centered droplets and then passing the gas stream through another body of water that is movable across the path of the gas stream to intercept the additional suspended droplets and remove them from the gas stream.

8. The process of cleaning a continuously-flowing gas-stream consisting in passing the gas-stream through a vessel having an inlet and an outlet, providing in said vessel a plurality of bodies of water which flow across the path of and intercept the gas-stream, preventing gravitation of the water by the pressure of the gas-stream flowing upwardly therethrough, condensing vapors in the gas on suspended particles in said stream at the bodies of water so that the suspended particles with the condensation thereon will be intercepted by the crosswise flowing bodies of water and be carried out of the path of the gas-stream.

In testimony whereof I affix my signature.

ROBERT R. HARMON.